United States Patent [19]

Chamberlain et al.

[11] Patent Number: 5,232,775
[45] Date of Patent: Aug. 3, 1993

[54] SEMI-CONDUCTING STATIC-DISSIPATIVE POLYMERIC COMPOSITES

[75] Inventors: Craig S. Chamberlain, Woodbury, Minn.; William J. Clatanoff; Christopher A. Schmolze, both of Austin, Tex.

[73] Assignee: Minnesota Mining and Manufacturing Company, St. Paul, Minn.

[21] Appl. No.: 601,530

[22] Filed: Oct. 23, 1990

[51] Int. Cl.$^5$ ............................................. B32B 5/16
[52] U.S. Cl. ................................... 428/323; 252/516; 252/518; 428/324; 428/327; 428/336; 428/363; 428/379; 428/403; 428/698
[58] Field of Search ............... 428/402, 403, 404, 406, 428/407, 324, 331, 336, 363, 698, 432, 327, 379; 252/516, 518, 520

[56] References Cited

U.S. PATENT DOCUMENTS

| | | | |
|---|---|---|---|
| 3,365,315 | 1/1968 | Beck et al. | 106/40 |
| 3,563,916 | 2/1971 | Takashina et al. | 252/511 |
| 3,576,378 | 4/1971 | Hilmanowski | 417/366 |
| 3,836,482 | 9/1974 | Ling et al. | 252/511 |
| 4,175,152 | 11/1979 | Carnahan et al. | 428/242 |
| 4,288,352 | 9/1981 | Weiss et al. | 260/23.5 A |
| 4,373,013 | 2/1983 | Yoshizumi | 428/570 |
| 4,391,646 | 7/1983 | Howell | 106/97 |
| 4,431,764 | 2/1984 | Yoshizumi | 524/409 |
| 4,579,882 | 4/1986 | Kanbe et al. | 523/137 |
| 4,612,242 | 9/1986 | Vesley et al. | 428/313.9 |
| 4,618,525 | 10/1986 | Chamberlain et al. | 428/209 |
| 4,634,865 | 1/1987 | Conway | 250/288 |
| 4,971,045 | 11/1990 | Probst | 126/65 |

*Primary Examiner*—Paul J. Thibodeau
*Assistant Examiner*—Hoa T. Le
*Attorney, Agent, or Firm*—Gary L. Griswold; Walter N. Kirn; Darla P. Neaveill

[57] ABSTRACT

A semi-conductive, static-dissipative polymeric composite comprising an insulative polymeric resin, and from about 5 to about 60 volume percent of a particulate filler having thin-film, inorganic coatings of semi-conducting material, such composites having volume resistivities of from about $1 \times 10^4$—to about $1 \times 10^{14}$ ohm-cm. In preferred semi-conductive, static-dissipative polymeric composites, the particulate filler has a thin-film coating of a semi-conducting material selected from the group consisting of transition metal oxides, carbides and nitrides.

2 Claims, No Drawings

SEMI-CONDUCTING STATIC-DISSIPATIVE POLYMERIC COMPOSITES

BACKGROUND OF THE INVENTION

1. Field of the Invention

The invention relates to electrostatic dissipative, semi-conducting polymeric composites. More specifically, the invention concerns static-dissipative polymeric composites consisting of an insulative polymeric based resin and an electrically active filler to make the resultant composition semi-conducting. The invention also relates to physical vapor deposition of a semi-conducting inorganic material onto the surface of particles.

2. Description of the Related Art

Traditional electrically active plastic composites use highly conductive fillers, such as particles, fibers or flakes in an insulative polymeric base resin. Commonly employed electrically active fillers include carbon powder, carbon fiber, metal powders, fibers and flakes, and metallized particles, fibers and flakes. These are disclosed in multiple patents, e.g., U.S. Pat. Nos. 4,634,865, and 4,288,352.

The filler must be used in an adequate volume for the individual particles or fibers to be in electrical contact in order for the resulting composite to be electrically conductive. The level of conductivity depends on the number of conductive paths created by the particles or fibers. Low levels of filler are ineffective, because there are few conductive paths. Therefore, to increase conductivity, the amount of filler must be increased. These techniques work well for composites in the conductive range (volume resistivity of $10^1$–$10^4$ ohm-cm) as this range falls in a region for highly conductive fillers where a small change in filler content has little effect on the conductivity of the composite because so many conductive paths exist.

However, using these techniques in the semi-conducting range (volume resistivity of $10^4$–$10^{14}$ ohm-cm) causes problems. For fillers of high conductivity, this range falls into a region where a small change in filler causes a large change in the conductivity of the composite. This makes the conductivity very difficult to control. This sensitive balance between the conductive filler and the insulative resin is further complicated by processing variations such as polymer/fiber orientation, density, shear rates and cooling rates.

Composites using highly conductive fillers also suffer from other detrimental characteristics:

In composites utilizing conductive fillers with a relatively high aspect ratio, i.e., fibers or flakes, the content of conductive filler to insulating polymer must be relatively low to control the number of connections. This results in greatly reducing the probability of providing a "ground" or an electrical path for a static charge to dissipate through.

In composites utilizing conductive powder fillers, e.g., carbon powder, as disclosed in U.S. Pat. Nos. 3,563,916 and 3,836,482, the composite exhibits "sloughing" where the powder filler rubs-off, out of the polymeric matrix.

In composites utilizing metals as the conductive filler, i.e., metal powders, fibers and flakes, as disclosed in U.S. Pat. No. 3,576,378, the metal particles are very dense compared to the polymer matrix and thus tend to separate from the matrix during processing resulting in a non-homogenous composite.

In composites utilizing conventional metallized particles, i.e., microspheres, microbubbles, fibers and flakes, the material coating is typically limited to solution processing techniques or "plating" where the coatings are relatively thick. Solution processing techniques limit the materials to those with high conductivities thereby yielding composites conductive rather than semi-conductive. In addition, plating technology has metal adhesion problems where the metal plating nodules pull away and separate from the host particle.

To be useful for semi-conductive composites, a filler must be less conductive than the "highly conductive" fillers, but not so resistive that an excessive volume loading is required to obtain the required conductivity, as this would have a negative effect on the mechanical properties of the composite.

Inorganic thin-film coating of metals onto particulate matter is known for a variety of purposes. U.S. Pat. Nos. 4,618,525, (Chamberlain et al.) and 4,612,242, (Vesley et al.) discloses glass microbubbles coated with a variety of metal oxides. Use of such bubbles as pigmenting fillers in pressure-sensitive adhesive tapes is disclosed. Electrical properties are not disclosed, nor is the use of such microbubbles as fillers in a plastic polymer.

Commonly used techniques to achieve controlled semi-conducting plastic composites consist of the incorporation of a semi-conducting material such as metal oxides (e.g., copper oxide) in particulate form into plastics. The particles are difficult to disperse and much denser than plastics resulting in heavy and expensive semi-conducting plastic composites.

Other controlled conductivity coated particles for anti-static plastics have been described in U.S. Pat. Nos. 4,373,013 and 4,431,764. These are titanium dioxide particles coated with antimony tin oxide. Again, these particles are difficult to disperse and much denser than plastics resulting in heavy and relatively expensive semi-conductive plastic composites. Further, the particles disclosed to be useful have an average particle size of $0.07\mu$ to $0.14\mu$.

U.S. Pat. No. 4,271,045, discloses an electrically conductive layer comprising a mixture of minute particles of semi-conductive material obtained through pyrolysis of a carbon-containing compound coated or doped with one or more Group III–VIII elements.

U.S. Pat. No. 4,175,152 discloses polymeric materials containing semiconducting pyropolymeric inorganic refractory oxide material having resistivity of from about 0.001 to about $10^{10}$ ohm-cm.

It has now been discovered that applying a thin-film coating of cupric oxide (CuO) on to the surface of microbubbles creates a semi-conducting filler that is easily dispersed in polystyrene at a 50 volume percent loading. The resulting composite exhibits superior electrical properties in the semi-conducting range (volume resistivity of $10^4$–$10^{14}$ ohm-cm), provides excellent "groundability" to dissipate electrical charge and provides very low density.

This particular composite promises application for protective products to service the electronic industry.

SUMMARY OF THE INVENTION

The invention provides semi-conductive, static dissipative polymeric composites comprising:
  a) an insulative polymeric resin, and
  b) from about 5 to about 60 volume percent of at least one particulate filler having a thin-film inorganic coating of semi-conducting material containing a transition metal, the composites having volume resistivities of from about $1\times10^4$ ohm-cm to about $1\times10^{14}$ ohm-cm.

Preferred semi-conductive, static-dissipative, polymeric composites comprise
  a) an insulative polymeric resin, and
  b) from about 5 to about 60 volume percent of at least one particulate filler having a thin-film coating of a semi-conducting material selected from the group consisting of transition metal oxides, carbides, and nitrides, the composites having volume resistivities of from about $1\times10^4$ ohm-cm to about $1\times10^{14}$ ohm-cm.

The invention further provides a method for making semi-conductive article of particles to make an economic, easily dispersable filler for semi-conducting plastic composites by applying a uniform, thin-film coating of an inorganic, semi-conducting material onto the surface of particles typical to the plastics industry as fillers. These semi-conducting particles can then be easily incorporated into insulative polymeric base resins where the resultant composite can be readily processed into an array of semi-conductive products.

As used herein, "thin-film" coating means a coating from 0.3 micron to about $1\mu$ in thickness.

DETAILED DESCRIPTION OF THE INVENTION

The invention is a semi-conducting plastic composite consisting of a semi-conducting filler material and an insulative base resin resulting in controllable electrical properties in the range of $10^4$–$10^{14}$ ohm-cm volume resistivity. In addition, the composite exhibits excellent groundability to dissipate any electrical charge and can be lightweight.

The semi-conducting filler is a thin-film coating of an inorganic, semi-conducting material on the surface of particulate fillers. This imparts excellent semi-conducting properties with relatively little semi-conducting material. In addition, the host particle filler can be selected to optimize the mechanical and physical properties of the composite. For example, microbubbles possess the necessary surface area and provide the conductive network to impart the semi-conducting properties while making the composite lightweight. Likewise, fibers also possess the necessary surface area and provide a conductive network while making the composite stronger.

Useful particulate fillers include particles, fibers, milled fibers, mica and glass flakes, glass and polymeric microbubbles, talc and (subsequently coated) crushed microbubbles.

Preferred particulate fillers include glass fibers, and glass microbubbles as disclosed in U.S. Pat. Nos. 3,365,315, 4,391,646, 4,618,525, all of which are incorporated herein by reference. The microbubbles provide a light weight filler, which provides reinforcement to the polymeric composite without adding undue weight. The microbubbles are also easily handled and processed.

In designing a static-dissipative polymeric composite for a particular application, one can select the base resin and filler system to meet the desired physical, mechanical and thermal requirements of the application. The specific semi-conducting coating, and the thickness can be selected to "dial-in" the desired electrical properties of the composite. This gives the ability to design mechanical and physical properties, and processability by selecting the particulate form of the filler, (e.g. fiber, flake or sphere), rather than the particulate form being dictated by the type of filler used to impart electrical properties as is the case with conventional electrical composites.

When preferred particulate fillers are used, volume loadings may range from about 5 to about 60 volume percent.

Useful insulative polymeric resins in composites of the invention include, but are not limited to thermosets such as epoxies, urethanes, and thermoplastics such as polyesters, polyethers, such as polyether sulfone, and polyolefins such as light, medium and high density polyethylene, ethylene-propylene copolymer, either random or block configuration, polypropylene-maleic acid anhydride, polystyrene, styrene-acrylonitrile copolymer, acrylonitrile-butadiene-styrene, poly(methyl methacrylate), ethylene vinyl acetate, ethylene-acrylic acid copolymer, vinyl chloride-propylene, polyisobutylene, polybutadiene, and crosslinked polyethylene, whether chemically, thermally or E-beam crosslinked, and polyphenylene sulfide, polyetheretherketone, polyetherimide, and polyarylsulfone.

The conductivity of semi-conducting plastic composites can be controlled by both the intrinsic conductivity of the filler material and the concentration of the filler in the insulative polymeric base resin. The invention provides a method for construction of controlled semi-conducting particles as fillers for incorporation into insulative polymeric based resins. This method describes techniques to obtain particles of different conductivity through coating composition and coating thickness. Additionally, the invention demonstrates this coating technique's application to numerous particles, to obtain a wide variation of physical and mechanical properties in the resulting static-dissipative polymeric composites.

The coated particulate fillers are typically made by physical vapor deposition, e.g., by sputtering or by vapor coating. Electroless plating, chemical vapor deposition and other conventional coating techniques should also be useful.

Test Methods

Measuring Electrical Conductivity of Coated Particles

The powder volume resistivity was measured using the following procedure. The test cell consisted of a Delrin TM block containing a cylindrical cavity with circular cross section of 1.0 cm$^2$. The bottom of the cavity was covered by a brass electrode. The other electrode was a 1.0 cm$^2$ cross section brass cylinder which fitted into the cavity. The powder to be tested was placed in the cavity, then the brass cylinder inserted. A weight was placed on top of the brass cylinder to exert a total pressure of 18 psi on the powder. The electrodes were connected to a digital multimeter to measure resistance. When the powder bed was 1.0 cm high the observed resistance was equivalent to the powder resistivity.

Calculating Particle Coating Thickness

The surface area of each type of particle was determined using the BET surface area method. The weight percent of metal on each type of particle was determined by dissolving portions of the coated particles in dilute hydrofluoric acid in combination with nitric, hydrochloric, or sulfuric acid as appropriate. The resulting solutions were analyzed by inductively coupled argon plasma atomic emission spectroscopy. The thickness of the conductive coating on the particle was estimated using the following relationship:

Coating thickness (Å) =

$$\frac{100 \times \text{wt \% metal}}{\text{Surface area (m}^2\text{/g)} \times \text{density of coating(g/cm}^3)}$$

Preparing Filled Plastics for Conductivity Testing

Coated particles were blended into polystyrene using the following procedure.

A Haake "Rheocord System 40" made by Haake-Buckler fitted with a "Rheomix" model 600 mixing head was set to a process temperature of 180° C. Polystyrene pellets were added. These were Styron TM 498 polystyrene obtained from Dow Chemical, Midland, Mich. These were allowed to melt, then mixed for three minutes at 20 rpm. Coated particles were then added. Enough material was added to charge 80% of the container volume (about 48 cm$^3$). The mixing speed was increased to 40 rpm. Mixing was carried out for seven minutes. The composite material was then removed from the chamber.

The composite material was placed between two flat aluminum plates lined with release liners. One millimeter thick spacers were also placed between the plates. This was placed in a Carver press fitted with heated platens. The temperature was set so as to melt the composite. Pressure was slowly applied so that a sheet of 1 mm thickness was obtained. This was allowed to cool, then removed from between the plates. This was then tested for volume resistivity.

Measuring Electrical Resistivity of Composite Sheets

The volume resistivity of the particle filled plastic material was measured in a manner similar to ASTM D257. A flat sheet of the plastic 1 mm thick and several inches in diameter was sandwiched between two aluminum foil electrodes. One electrode was smaller in diameter than the sheet and the other electrode was about the same size. Exact diameter of the electrodes is not critical as volume resistivity is geometry independent. Nonconductive foam sheets were placed both on top and under the electrodes, then this was sandwiched between two flat metal plates. Moderate pressure was applied to ensure good contact between the foil electrodes and the plastic. A General Radio type 1644A Megohm bridge was connected to the two electrodes. A potential of 500 volts was applied across the electrodes. The resistance was measured after the voltage had been applied for 60 seconds. The volume resistivity was calculated from the formula:

Volume resistivity (ohm-cm) =

$$\frac{\text{Resistance (ohms)} \times \text{area of smaller electrode (cm}^2)}{\text{Sheet thickness (cm)}}$$

EXAMPLES

EXAMPLE 1

This example demonstrates thin copper oxide coatings on glass bubbles.

Glass bubbles available as Scotchlite TM S60/10000 glass bubbles were obtained from Minnesota Mining and Manufacturing Company, St. Paul, Minn. These were coated with 30 Å of copper oxide in the following manner. The glass bubbles (760 grams, 2 liters) were placed into a vacuum chamber and slowly tumbled. Copper metal was sputter deposited onto the tumbled bubbles at a planar deposition rate of about 6000 Å/min. The sputtering cathode was a water-cooled rectangular target, 12.7×20.3 cm in size. The sputtering gas was argon at a pressure of 3 millitorr. The cathode was operated in the dc magnetron mode at a power of 2.0 kilowatts with a resultant cathode potential of 530–600 volts and current of 3.3–3.7 amperes. Oxygen was introduced into the chamber in the vicinity of the particles at a rate of 14 cubic centimeters per minute. The total coating time was 4.0 hours. The resultant material had a bulk powder resistivity of 456 kilohm-cm. It was then placed in an air-filled oven at 500° C. for 16 hours. The resistivity was 300 kilohm-cm and the density was 0.71 g/cm$^3$.

The coated powder was blended into polystyrene at 50% loading by volume using the method described above. The density of the composite was 0.84 g/cm$^3$. This was hot-pressed into a sheet which had a volume resistivity of 6.5×10$^{10}$ ohm-cm.

EXAMPLE 2

This example demonstrates thick copper oxide coatings on glass bubbles in polystyrene.

Scotchlite TM S60/10000 glass bubbles were coated with 151 Å of copper oxide in the same manner as described in example 1, except that sputter deposition was carried out at 7.0 kw for 450 minutes on 760 grams of bubbles, with an oxygen flow rate of 50 cm$^3$/min. The resistivity of the coated material was 496 kilohm-cm. The heat treated material had a resistivity of 37 kilohm-cm and a density of 0.80 g/cm$^3$. A portion of the coated material was blended into polystyrene at a volume loading of 50% using the method described above. It had a density of 0.88 g/cm$^3$. This was hot-pressed into a sheet which had a volume resistivity of 8.7×10$^6$ ohm-cm.

EXAMPLE 3

This example demonstrates thick copper oxide coating on bubbles in polyether sulfone.

Powdered polyether sulfone available as Victrex TM PES from ICI Advanced Materials, Wilmington, Del. was mixed with a portion of the coated material prepared in Example 2 and hot pressed at 360° C. to make a 1 mm thick sheet. This had a volume resisitivity of 2.2×10$^{11}$ ohm-cm.

EXAMPLE 4

This example demonstrates copper oxide coatings on milled glass fibers.

Milled glass fibers available as Fiberglas TM from Owens-Corning Fiberglas Corporation, Toledo, Ohio were coated with 170 Å copper oxide in the same manner as described in Example 1, except that sputter deposition was carried out at 2.0 kw for 180 minutes on 202 grams of fibers, with an oxygen flow rate of 12 cm$^3$/min. After heat treatment the resistivity was 51 kilohm-cm. A 30% by volume polystyrene sheet was then prepared as described above. This had a volume resistivity of 6×10$^{10}$ ohm-cm.

EXAMPLE 5

This example demonstrates copper oxide coatings on mica flakes.

Mica flakes available as 200 Hk Suzorite TM mica from Marietta Resources International Ltd., Hunt Valley, Md. were coated with 31 Å of copper oxide in the same manner as described in Example 1, except that sputter deposition was carried out at 4.0 kw for 257 minutes on 460 grams of mica with an oxygen flow rate of 28 cm$^3$/min. The resistivity of the coated material was 654 kilohm-cm. After heat treatment the resistivity was 41 kilohm-cm. A 15% by volume polystyrene sheet was then prepared as described above. This had a volume resistivity of $5 \times 10^{13}$ ohm-cm.

EXAMPLE 6

This example demonstrates titanium nitride coating on glass bubbles.

Scotchlite TM B37/2000 glass bubbles available from Minnesota Mining and Manufacturing, St. Paul, Minn. were coated with 220 Å of titanium nitride in the same manner as described in Example 1, except that a titanium target was run at a power of 0.50 kw for 360 minutes on 28 grams of bubbles, with a nitrogen flow rate of 4 cm$^3$/min for the first 180 minutes and 2.5 cm$^3$/min for the second 180 minutes. The coated particles had a resistivity of 3.8 ohm-cm and a density of 0.38 g/cm$^3$.

A bubble filled epoxy sheet was then made in the following manner. Coated bubbles were mixed into enough Devcon TM 5 Minute TM epoxy to make up a 50% by volume composite which has an expected density of 0.8 g/cm$^3$. The filled plastic sheet had a resistivity of $4.8 \times 10^6$ ohm-cm.

EXAMPLE 7

This example demonstrates copper oxide coatings on milled carbon fibers.

Fortafil TM F3(C)A milled carbon fibers were obtained from Akzo Fortafil Fibers Inc., Knoxville, Tenn. These were coated with 320 Å of copper oxide in the same manner as Example 1, except that sputter deposition was carried out at 5.0 kw for 180 minutes on 49 grams of fibers, with an oxygen flow rate of 30 cm$^3$/min. The resistivity of the coated fibers was 22 kilohm-cm whereas that for the uncoated fibers was 0.7 ohm-cm.

An epoxy sheet containing 10% by volume coated fibers was prepared as described above. The volume resistivity was measured in a manner similar to that described above, except that a digital ohm meter was used. The volume resistivity was $1.4 \times 10^5$ ohm-cm.

A second sheet was prepared at 20% loading which had a volume resistivity of $2.2 \times 10^5$ ohm-cm. For comparison, uncoated carbon fibers loaded into epoxy at the same loadings gave resistivities of $1.1 \times 10^5$ and $4.6 \times 10^3$ ohm-cm respectively.

This example illustrates the fact that composites containing coated fibers prepared at different volume loadings can give approximately the same resistivity whereas uncoated fibers will provide lower (undesirable) resistivities with increased volume loading. This may be an advantage where higher strength of the composite may be achieved by higher fiber loadings while the conductivity is still kept in the desired range.

This example also illustrates that the copper oxide coating can be used to make a particle less conductive, in contrast to the other examples where the particles were made more conductive by the coating. In other words, the copper oxide coating dominates the conductivity of the particle.

What is claimed is:

1. A semi-conductive, static-dissipative polymeric composite comprising:
   a) an insulative polymeric resin, and
   b) from about 5 to about 30 volume percent carbon fibers having a thin film inorganic coating comprising at least one semi-conducting material selected from the group consisting of transition metal oxides, transition metal carbides and transition metal nitrides, said coating having a thickness of from about 0.04 micrometer to about 1 micrometer, said composites having volume resistivities of from about $1 \times 10^4$ to about $1 \times 10^{10}$ ohm-cm.

2. A semi-conductive, static-dissipative polymeric composite comprising:
   a) an insulative polymeric resin, and
   b) from about 15 to about 60 volume percent mica flakes having a thin film inorganic coating comprising at least one semi-conducting material selected from the group consisting of transition metal oxides, transition metal carbides and transition metal nitrides, said coating having a thickness of from about 0.04 micrometer to about 1 micrometer, said composites having volume resistivities of from about $1 \times 10^4$ to about $1 \times 10^{10}$ ohm-cm.

* * * * *